United States Patent [19]

Kuroki

[11] Patent Number: 4,968,076
[45] Date of Patent: Nov. 6, 1990

[54] BUMPER STRUCTURE FOR USE IN A VEHICLE

[75] Inventor: Kenji Kuroki, Hamamatsu, Japan

[73] Assignee: Suzuki Motor Company Limited, Shizuoka, Japan

[21] Appl. No.: 333,693

[22] Filed: Apr. 4, 1989

[30] Foreign Application Priority Data

Jul. 8, 1988 [JP] Japan .................. 63-170365

[51] Int. Cl.⁵ ............................................ B60R 19/02
[52] U.S. Cl. .................................... 293/121; 293/109
[58] Field of Search ............... 293/120, 121, 122, 102, 293/109, 107, 115

[56] References Cited

U.S. PATENT DOCUMENTS

| | | | |
|---|---|---|---|
| 3,869,167 | 3/1975 | Muller | 293/122 X |
| 3,884,516 | 5/1975 | Gallion et al. | 293/120 |
| 4,030,735 | 6/1977 | Jacob et al. | 293/122 |
| 4,208,069 | 6/1980 | Huber et al. | 293/102 |
| 4,325,574 | 4/1982 | Umemoto et al. | 293/120 |
| 4,361,352 | 11/1982 | Wakamatsu | 293/120 |
| 4,786,093 | 11/1988 | Nishii | 293/120 |

FOREIGN PATENT DOCUMENTS

| | | | |
|---|---|---|---|
| 2919046 | 11/1980 | Fed. Rep. of Germany | 293/120 |
| 3328978 | 2/1985 | Fed. Rep. of Germany | 293/102 |
| 172848 | 10/1982 | Japan | 293/120 |
| 190045 | 10/1984 | Japan | 293/120 |

Primary Examiner—Margaret A. Focarino
Assistant Examiner—Joseph D. Pape
Attorney, Agent, or Firm—McGlew and Tuttle

[57] ABSTRACT

A bumper structure for use in a vehicle of the type including a bumper facing member for covering the front part of the bumper, an energy absorbing member inserted into the interior of the bumper facing member, and a bumper armature for the reinforcement of the bumper facing member and the shock loads absorbing element is provided, which comprises in combination the bumper facing member defined with a longitudinal recess extending longitudinally and located in position below the shock loads absorbing element and near the bumper armature, and a plurality of fixing means for the fixation of the bumper facing member to the bumper armature, more than one cuts-out being defined in the upper surface of the longitudinal recess.

5 Claims, 4 Drawing Sheets

BUMPER STRUCTURE FOR USE IN A VEHICLE

FIELD OF THE INVENTION AND RELATED ART STATEMENT

The present invention relates to a bumper structure for use in a vehicle, and more particularly to an improvement in the structure of a bumper for use in an automotive vehicle which presents a good-looking appearance, and which is stout in construction enough to be undeformed from shock loads in a bump or collision to be encountered by a vehicle.

The typical construction of a bumper as shown in FIG. 5 has been known for use in a vehicle.

Such a conventional vehicle's bumper of the construction shown comprises a bumper facing member 101 formed from a synthetic resin or the like material and adapted to cover the front surface of a bumper, a shock load absorbing element 102 inserted into the interior of the bumper facing member 101 and adapted to absorb shock loads or energy generated from a bump or collision of a vehicle, and a bumper armature 103 adapted to reinforce the construction of the bumper facing member 101 and of the shock load absorbing element 102, and in this typical construction, the bumper facing member 101 is fixed securely to the bumper armature 103 by using a plurality of screws 104 at several positions above and below the bumper assembly, as generally shown in FIG. 5.

However, according to the construction of a vehicle's bumper, such screws 104 are seen from the outside as shown generally in FIG. 6 which is a perspective view showing the rear part of a vehicle, and this would spoil substantially the beauty of the bumper.

In addition, as shown in FIG. 7, a crack or other breakage would possibly occur in the bumper facing member 101 from shock loads as encountered in a bump or collision, as there is no particular part which may disperse or dissipate an external force which is rendered upon the bumper.

OBJECT AND SUMMARY OF THE INVENTION

The present invention has been contemplated essentially in view of such a problem that has been left unsolved effectively, and so it is an object of the invention to provide an improvement in the construction of a bumper for an automotive vehicle which may present a good-looking appearance, and which would not suffer from cracks or other damages from shock loads generated more or less in a bump or collision of a vehicle.

In an attempt to solve the problems as noted above, there is provided an improved construction of a bumper according the present invention including a bumper facing member for covering the front part of a bumper assembly, a shock load absorbing element inserted into the interior of the bumper facing member, and a bumper armature for the reinforcement in construction of the bumper facing member and the shock load absorbing element, which comprises, as summarized in brief, a bumper facing member is defined with a recess extending longitudinally and near the bumper armature on the lower part thereof below the shock load absorbing element, a fixing means to the bumper armature provided in the recess, and more than one cut-outs defined on the upper surface of the recess.

As stated herebefore, by virtue of the employment of the longitudinal recess defined extending longitudinally in the bumper facing member located in position below the shock load absorbing element, and the provision of the fixing means to the bumper armature, there is attained such an advantageous effect that there is seen none of such fixing means from the outside, whereby the bumper assembly may present a substantial betterment in its appearance, accordingly.

Also, according to the present invention which adopts more than one cut-outs defined in the upper surface of the longitudinal recess, there is attained such a further advantage that the bumper facing member is in a form which may readily be deformed with shock loads with the existence of such cut-outs, and which may efficiently disperse or dissipate an external force as generated from such shock loads, whereby an improved bumper assembly for a vehicle which can hardly be damaged to produce cracks from substantial shock loads may be attained accordingly.

BRIEF DESCRIPTION OF THE DRAWINGS

The following detailed description of the invention refers to the accompanying drawings by way of a preferred embodiment thereof, wherein like parats are designated by like reference numerals, and wherein FIGS. 1 through 4 are views showing the present invention by way of a preferred embodiment thereof, and wherein FIG. 1 is a schematic perspective view showing generally the appearance of a four-wheeled automotive vehicle;

FIG. 2 is a longitudinal cross-sectional view showing the general construction of a bumper according to the present invention taken along the line A—A in FIG. 1;

FIG. 3 is a plan view seen in the direction shown by an arrow A in FIG. 2;

FIG. 4 is a similar cross-sectional view showing the state of a bumper where it is subjected to shock loads from a bump or collision;

FIG. 5 is a cross-sectional view showing the typical construction of a conventional bumper;

FIG. 6 is a perspective view showing generally the rear part of a vehicle of the prior art: and FIG. 7 is a similar cross-sectional view showing the state that a conventional bumper is subjected to shock loads from a bump or collision.

DETAILED DESCRIPTION OF A PREFERRED EMBODIMENT

The present invention will now be explained in detail by way of a preferred embodiment thereof in conjunction with the accompanying drawings, as follows.

Figure 1:
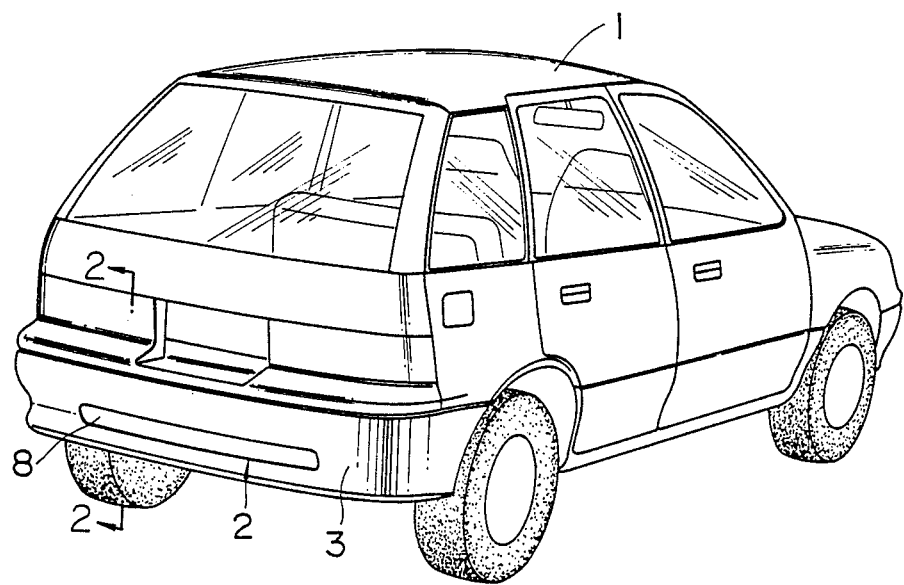
Figure 2:
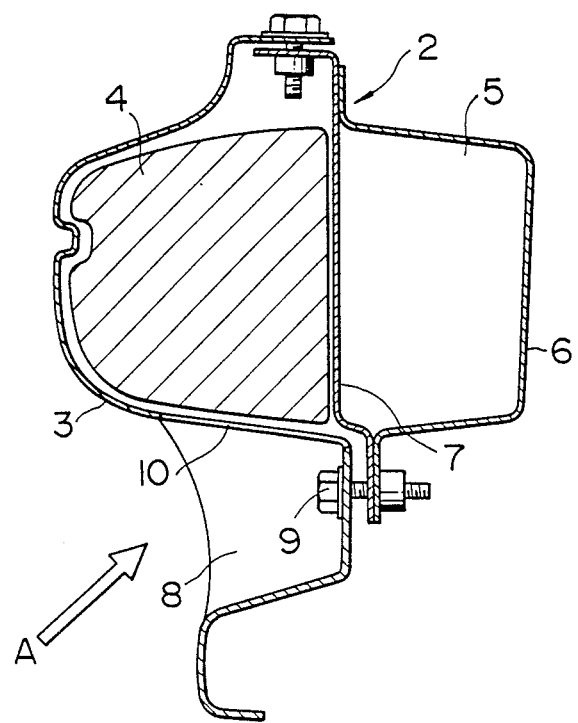
Figure 3:
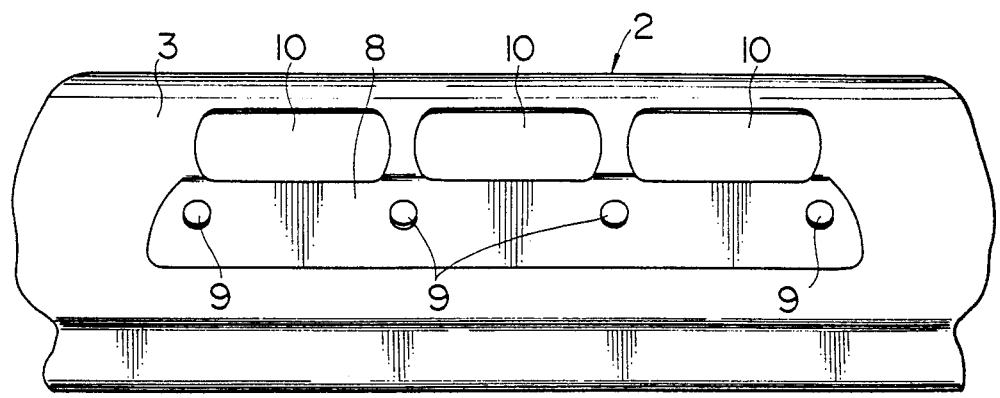
Figure 4:
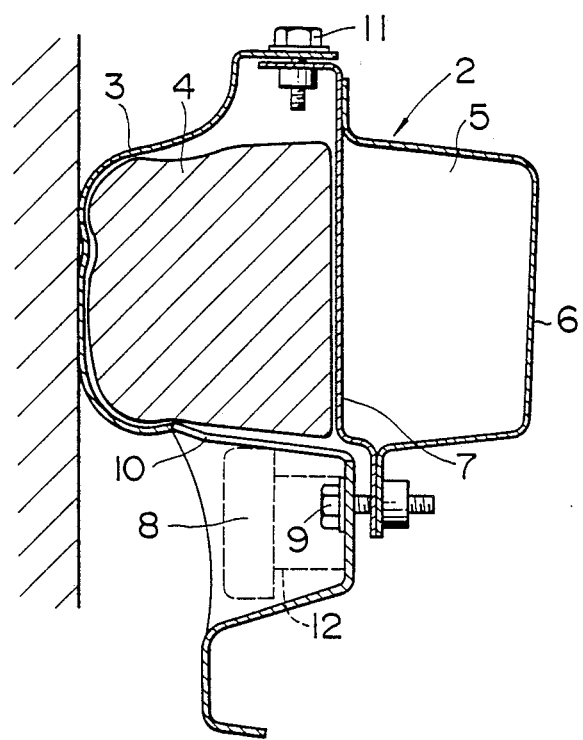
Figure 5:
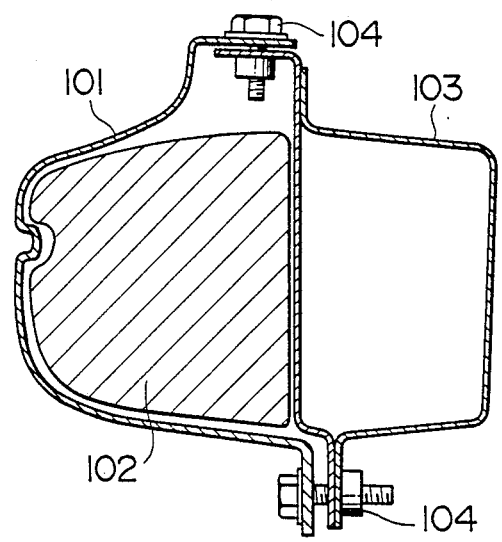
FIGS. 5 through 7 are those showing a typical conventional bumper; and more specifically.
Figure 6:
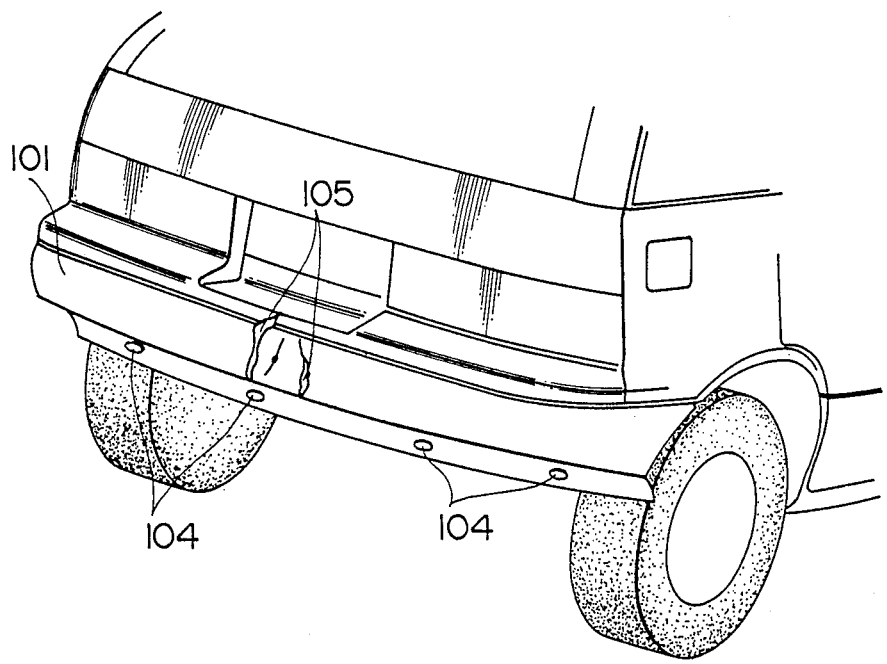
Figure 7:
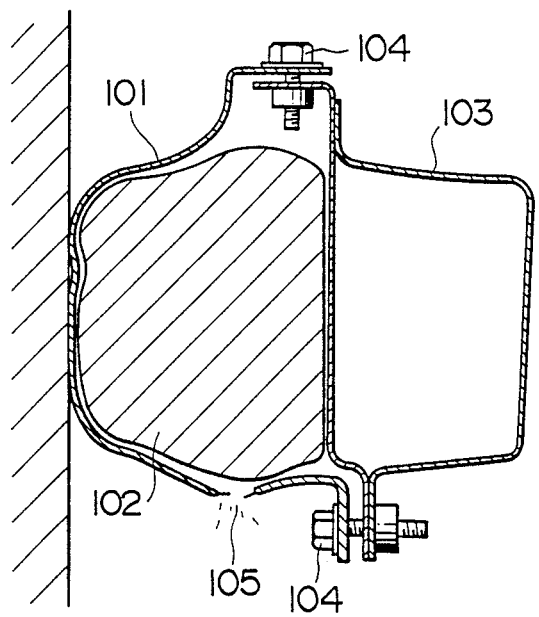

In the drawings, FIG. 1 is a schematic perspective view showing generally the appearance of a four-wheeled automotive vehicle, FIG. 2 is a longitudinal cross-sectional view showing the general construction of a bumper according to the present invention taken along the line A—A in FIG. 1, and FIG. 3 is a plan view seen in the direction shown by an arrow A in FIG. 2.

In these drawings, there are shown a vehicle's body designated by the reference numeral 1, and a rear bumper assembly by 2 which is mounted in the rear of the vehicle's body 1. This rear bumper 2 comprises, as generally shown in cross-section in FIG. 2, a bumper facing member 3 formed from a synthetic resin or the like material for covering the front of the bumper assembly, a shock loads absorbing element 4 formed from foamed urethane or formed in a resin block, and a bumper armature 5 for the reinforcement of the bumper facing member 3 and the shock loads absorbing element 4 which are assembled together.

The bumper armature 5 is comprised of an inner panel 6 and an outer panel 7 which as welded together to form a closed spacing therein. Also, the bumper facing member 3 has a lower portion including a substantially horizontal upper wall and a substantially vertical inner wall to define a longitudinal recess 8 extending longitudinally thereof in position below the shock loads absorbing element 4, and in this longitudinal recess 8 there are seen located a plurality of screws 9, which is a fixing means to fix the bumper facing member 3 together with the bumper armature 5. There are also defined three openings of an elliptical shape 10 in the upper side of the longitudinal recess 8 as typically shown in FIG. 3.

The fixation between the bumper facing member 3 and the bumper armature 5 in the upper position thereof may be performed securely by way of a pluralilty of screws 11 as in the conventional manner.

According to the improvement in the construction of the vehicle's bumper of the present invention with the provision of the longitudinal recess 8 formed in the bumper facing member 3 and the fixing means 9 for the fixation of the bumper armature 5 to the vertical wall in the longitudinal recess 8, there is seen nothing of the fixing means 9 from the outside as typically shown in FIG. 1, which is the perspective view showing generally the entire vehicle, whereby the improvement in the general appearance in the bumper construction may be attained substantially.

On the other hand, it is possible in practice to dispose such an attachment as a rear fog lamp and/or a backward sensor 12 snugly in the concave or pocket defined by the recess 8, and for this purpose, there is no further need for the provision of any spaces, thus making it ready to do so.

More specifically, with the provision of three cut-outs of elliptic shape 10 in the upper recessed surface of the longitudinal recess 8, when the vehicle's bumper assembly is subjected to shock loads from the bump or collision, it is advantageous that the bumper facing member 3 may be deformed substantially with the existence of such cut-outs so as to disperse or dissipate an external force rendered in this particular position from such shock loads, so that cracks may well be prevented from occuring in the bumper facing member 3 per se, and also that an impact energy from such a bump or collision may efficiently be relayed to the shock loads absorbing element 4, accordingly.

While the description as disclosed herein is essentially directed to the improvement in a bumper construction for use in an automotive vehicle, it is to be understood that the invention is not intended to be restricted to the details of the specific constructions and arrangement of parts involved therein as disclosed typically herein, but to contrary, the invention can of course be adapted equally to any other means for a similar effect and performance in accordance with the foregoing teachings without being restricted thereto and without departing from the spirit and scope of the invention.

For instance, while the screws 9 are employed as a fixing means for the fixation of the bumper facing member 3 to the bumper armature 5, this means may not be restricted thereto, but may of course be replaced with a clip or the like means to an equal effect.

Also, while there are three cut-outs 10 are formed in an ellipstic shape, they may of course be formed in any other shape and number, and also they may only be placed in the upper surface of the longitudinal recess 8.

It is to be understood that the appended claims are intended to cover all of such generic and specific features as are particular to the invention as disclosed herein and all statements relating to the scope of the invention, which as a matter of language might be said to fall thereunder.

What is claimed is:

1. A bumper structure, comprising: a bumper armature; a bumper facing defining an outer surface of the bumper and defining an interior region; an energy absorbing member positioned inside said bumper facing at said interior region, said bumper facing including a lower bumper facing portion entending below said energy absorbing member, said lower bumper facing portion including a longitudinally extending recess with a substantially horizontal upper wall forming an upper surface of said recess and a substantially vertical wall forming an inner surface of said recess, said substantially horizontal upper wall being formed with a plurality of cut-outs, said substantially vertical wall being positioned adjacent said bumper armature; and, lower fixing means fixing said substantially vertical wall of said lower bumper facing to said bumper armature.

2. A bumper structure according to claim 1, wherein said longitudinal recess is formed as a single recess continuously extending from a first end of the bumper to a second end of the bumper.

3. A bumper structure according to claim 1, wherein said fixing means comprises plural screw and nut sets.

4. A bumper structure according to claim 1, wherein said cut-outs formed in said substantially horizontal upper wall are of an elliptical shape.

5. A bumper structure comprising: a bumper armature including a lower substantially vertical flange; a bumper facing defining an outer surface of the bumper, said bumper facing cooperating with said bumper armature to define an interior region; an energy absorbing member positioned inside said bumper facing at said interior region; said bumper facing including a lower bumper facing portion extending below said energy-absorbing member, said lower bumper facing portion including a longitudinally extending recess with a substantially horizontal upper wall defining a lower boundary of said interior region and a substantially vertical wall positioned adjacent said bumper armature lower flange, said substantially horizontal upper wall being formed with a plurality of cut-outs; and fixing means for fixing said substantially vertical wall to said lower flange of said bumper armature.

* * * * *